(12) United States Patent
De Smet (10) Patent No.: US 8,631,536 B1
(45) Date of Patent: Jan. 21, 2014

(54) WINDSHIELD WIPER CONTROL SYSTEM

(71) Applicant: CNH America LLC, New Holland, PA (US)

(72) Inventor: Raf De Smet, Zedelgem (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/725,060

(22) Filed: Dec. 21, 2012

(51) Int. Cl.
*B60S 1/36* (2006.01)

(52) U.S. Cl.
USPC ............. 15/250.23; 15/250.21; 74/23; 74/43

(58) Field of Classification Search
USPC ................. 15/250.21, 250.23, 250.3, 250.31, 15/250.16; 74/23, 24, 25, 42, 43, 51
See application file for complete search history.

(56) References Cited

U.S. PATENT DOCUMENTS

| | | | | |
|---|---|---|---|---|
| 1,709,932 | A | * | 4/1929 | Carson ........................ 15/250.23 |
| 2,079,399 | A | * | 5/1937 | Drew et al. ................ 15/250.23 |
| 3,590,415 | A | | 7/1971 | Mori |
| 3,599,270 | A | | 8/1971 | Mori |
| 3,688,334 | A | * | 9/1972 | Peterson .................... 15/250.21 |
| 3,729,766 | A | | 5/1973 | Buchanan, Jr. |
| 3,866,258 | A | * | 2/1975 | DeGraw ...................... 15/250.29 |
| 4,732,048 | A | | 3/1988 | Sakakibara et al. |
| 6,966,095 | B2 | | 11/2005 | Brown |

FOREIGN PATENT DOCUMENTS

| | | |
|---|---|---|
| DE | 3334011 A1 | 4/1985 |
| EP | 0520960 A1 | 12/1992 |
| FR | 2487754 A1 | 2/1982 |
| FR | 2563788 A1 | 11/1985 |
| JP | 58159073 A | 9/1983 |
| JP | 62031548 A | 2/1987 |
| JP | 2001315621 A | 11/2001 |

\* cited by examiner

*Primary Examiner* — Gary Graham
(74) *Attorney, Agent, or Firm* — Patrick M. Sheldrake (57) ABSTRACT

A windshield wiper control system includes a movable element configured to move in a first direction and an opposing second direction and one or more actuation devices configured to cause the movable element to move in the first direction. The windshield wiper control system also includes a rotatable cam configured to cause the movable element to move in the opposing second direction when the rotatable cam contacts a stationary surface as the rotatable cam rotates about a cam axis and a wiper mechanism configured to move in the first and second directions and pivot in an arc motion responsive to the rotation of the rotatable cam. The wiper mechanism is further configured to cause the one or more windshield wipers to move across a surface of a windshield in a more linear motion than the arc motion of the wiper mechanism.

18 Claims, 11 Drawing Sheets

WINDSHIELD WIPER CONTROL SYSTEM

TECHNOLOGY FIELD

The present invention relates generally to a control system for a windshield wiper control system, and more particularly to methods and systems to control the movement of windshield wipers.

BACKGROUND

Windshield wipers are used to clean the windshield of a vehicle so that the driver of the vehicle has a less obstructed view. Windshield wiper systems are used on a variety of vehicles, such as cars, trucks and industrial vehicles, including harvesting vehicles such as combines, tractors and balers.

In conventional windshield wiper systems, the wipers move across the windshield in an arc motion (non-linear). The top edges of windshields, however, are typically shaped differently (e.g., more linear) than the arc motion of the wipers in these conventional windshield wiper systems. Accordingly, when these conventional windshield wipers move across the windshield, an upper area of the windshield between the top edge of the windshield and the arc shape of the uppermost edge of the wiped area may not be wiped by the conventional wiper. This unwiped area or portions of the unwiped area may be in lines of sight that interfere with an operator's vision of objects outside of the vehicle.

Conventional systems that address these unwiped windshield areas are complex systems that may, for example, use multiple motors, multiple actuators and/or multiple cams, which are more expensive, occupy more space and allow for more potential problems to occur. An improved windshield wiper system is needed.

SUMMARY

Embodiments of the invention are directed to a windshield wiper control system that includes a movable element configured to move in a first direction and an opposing second direction and one or more actuation devices configured to provide a first force to the movable element causing the movable element to move in the first direction. The windshield wiper control system also includes a rotatable cam configured to provide a second force to the movable element causing the movable element to move in the opposing second direction when the rotatable cam contacts a stationary surface as the rotatable cam rotates about a cam axis. The windshield wiper control system further includes a wiper mechanism: (i) coupled to the movable element and configured to move in the first and second directions; and (ii) coupled to the rotatable cam and configured to pivot about a wiper mechanism pivot axis in an arc motion responsive to the rotation of the rotatable cam. The wiper mechanism is further configured to be coupled to one or more windshield wipers to cause the one or more windshield wipers to move across a surface of a windshield in a more linear motion than the arc motion of the wiper mechanism.

According to one embodiment, the wiper mechanism is further configured to cause one or more windshield wipers to move across the surface of the windshield substantially parallel to a top edge of the windshield.

According to another embodiment, the windshield wiper control system further includes a fixed element configured to remain stationary with respect to the movable element. The one or more actuation devices comprise one or more force mechanisms coupled between the movable element and the fixed element to move the movable element.

According to an aspect of an embodiment, the fixed element includes one or more side rails and the movable element is configured to move in the first and second directions by sliding along the one or more side rails.

According to another aspect of an embodiment, the stationary surface is a curved surface.

In one embodiment, the rotatable cam is further configured to provide the second force to the movable element when opposing edges of the cam contact the stationary surface as the rotatable cam rotates about the cam axis.

In an aspect of an embodiment, the rotatable cam includes rotatable wheels at the opposing edges of and the rotatable wheels are configured to rotate as they contact the stationary surface.

According to one embodiment, the windshield wiper control system further includes a driving rod configured to rotate about the cam axis at a driving rod end and remain substantially perpendicular to the rotatable cam when the driving rod rotates about the cam axis. The control system further includes a coupling bar rotatably coupled to the driving rod at an opposing driving rod end and pivotably coupled to the wiper mechanism at the wiper mechanism pivot axis.

In one embodiment, the wiper mechanism includes one or more wiper mechanism arms configured to pivot responsive to the rotation of the rotatable cam.

In an aspect of an embodiment, the one or more wiper mechanism arms include a first wiper mechanism arm extending from the coupling bar and configured to pivot about the wiper mechanism pivot axis responsive to the rotation of the rotatable cam and a second wiper mechanism arm coupled to the first wiper mechanism arm and configured to pivot about another wiper mechanism pivot axis. The first wiper mechanism arm and the second wiper mechanism arm are configured to remain substantially parallel to each other when they pivot about their respective axis.

In another embodiment, the control system further includes one or more pantograph arms coupled between the one or more windshield wipers and the one or more wiper mechanism arms.

Embodiments of the invention are directed to an automobile that includes an automobile body, a windshield coupled to the automobile body having opposing top and bottom edges and opposing side edges and one or more windshield wipers configured to move across a surface of the windshield. The automobile also includes a windshield wiper control system that includes a movable element configured to move in a first direction and an opposing second direction and one or more actuation devices configured to provide a first force to the movable element to cause the movable element to move in the first direction. The automobile further includes a rotatable cam configured to provide a second force to the movable element to cause the movable element to move in the opposing second direction when the rotatable cam contacts a stationary surface as the rotatable cam rotates about a cam axis. The automobile further includes and a wiper mechanism: (i) coupled to the movable element and configured to move in the first and second directions; and (ii) coupled to the rotatable cam and configured to pivot about a wiper mechanism pivot axis responsive to the rotation of the rotatable cam. The wiper mechanism causes the one or more windshield wipers to move across the surface of the windshield between the opposing side edges and substantially parallel to the top edge of the windshield.

According to one embodiment, the automobile further includes a fixed element configured to remain stationary with respect to the movable element. The one or more actuation devices includes one or more spring force mechanisms coupled between the movable element and the fixed element.

According to an aspect of an embodiment, the fixed element is coupled to the automobile body.

In one embodiment, the rotatable cam is further configured to provide the second force to the movable element when opposing edges of the cam contact the stationary surface as the rotatable cam rotates about the cam axis.

In another embodiment, the wiper mechanism includes a plurality of wiper mechanism arms coupled to the one or more windshield wipers. The plurality of wiper mechanism arms include a first wiper mechanism arm configured to pivot about the wiper mechanism pivot axis responsive to the rotation of the rotatable cam and a second wiper mechanism arm coupled to the first wiper mechanism arm and configured to pivot about another wiper mechanism pivot axis. The first wiper mechanism arm and the second wiper mechanism arm are configured to remain substantially parallel to each other when they pivot about their respective axis.

According to an embodiment, the plurality of wiper mechanism arms are coupled to the one or more windshield wipers via respective first and second pantograph arms.

According to another embodiment, the wiper mechanism is further configured to move the one or more windshield wipers across the surface of the windshield to cause a substantially rectangular shaped wiped area on the surface of the windshield.

Embodiments of the invention are directed to a method of controlling windshield wipers that includes providing: (i) a first force to a movable element to move the movable element in a first direction and (ii) a second force to the movable element to move the movable element in a second direction and moving a wiper mechanism (i) in the first direction responsive to the movement of the movable element in the first direction; and (ii) the second direction responsive to the movement of the movable element in the second direction. The method also includes pivoting the wiper mechanism about a wiper mechanism pivot axis in an arc motion and causing one or more windshield wipers to move across a surface of a windshield in a more linear motion than the arc motion of the wiper mechanism.

According to an embodiment, the method further includes moving the one or more windshield wipers across the surface of the windshield substantially parallel to an upper edge of the windshield.

According to another embodiment, providing the second force further includes causing opposing edges of a rotating cam to contact a stationary surface when a rotatable cam rotates about a cam axis and pivoting the wiper mechanism about the wiper mechanism pivot axis in the arc motion is responsive to the rotation of the rotatable cam.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATED EMBODIMENTS

Embodiments of the present invention provide systems and methods for providing a control system for one or more windshield wipers. Embodiments of the present invention provide an improved windshield wiper system that increases the wiped area on the windshield and decreases the unwiped area of the windshield using a single motor to rotate a single cam. Embodiments of the present invention utilize a first force applied to a movable element and a second force applied to a rotating cam to cause the one or more windshield wipers to move across a surface of a windshield in a more linear motion than conventional wiper systems. Embodiments of the present invention may cause the one or more windshield wipers to move across a surface of a windshield in a substantially linear motion. Embodiments of the present invention cause one or more wipers to move across a surface of a windshield substantially parallel to an upper edge or lower edge of the windshield to decreases the unwiped area of the windshield.

Figure 1:
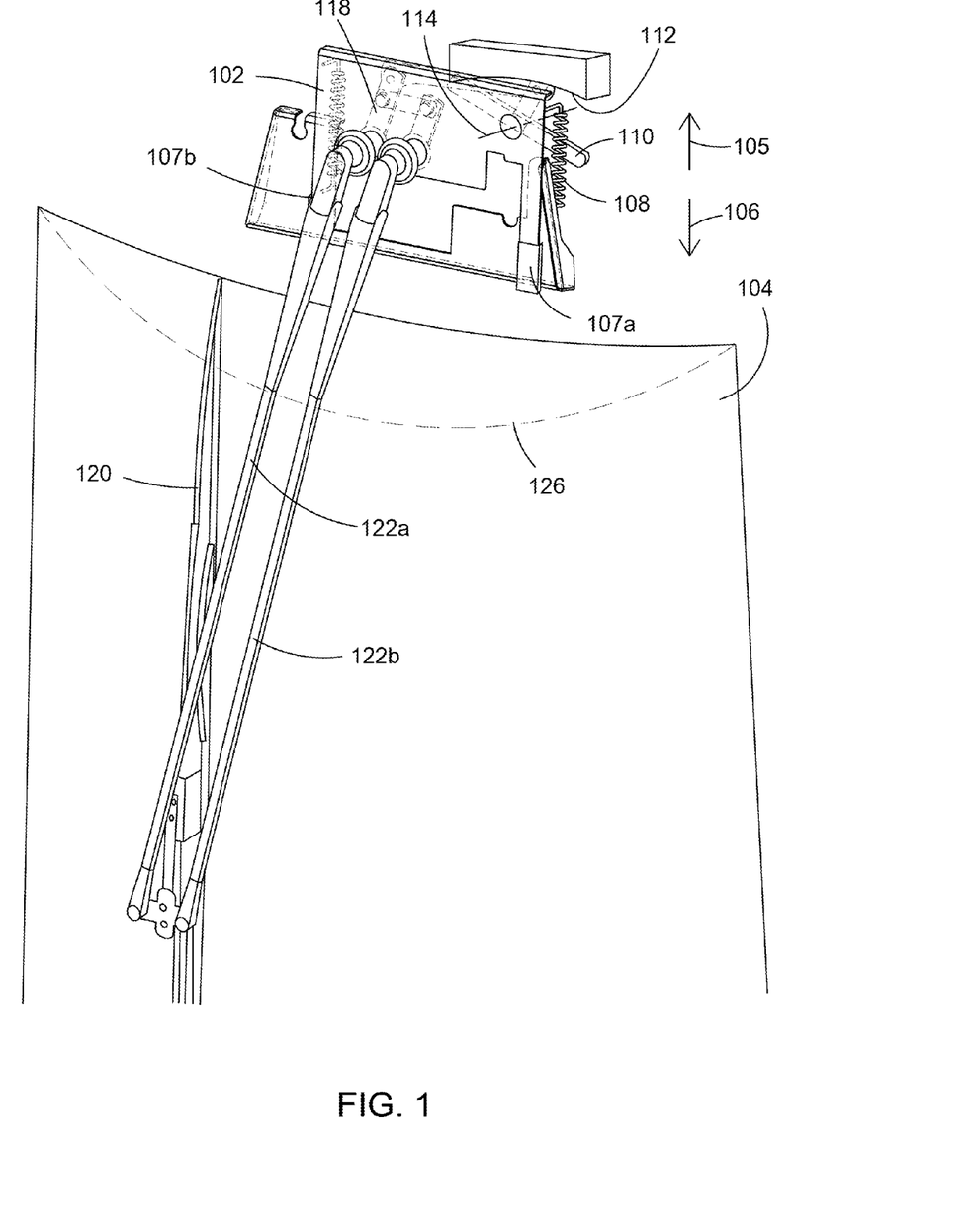
FIG. 1 is a perspective view of an exemplary windshield wiper control system coupled to a windshield wiper for use with embodiments of the present invention.

FIG. 1 is a perspective view of an exemplary windshield wiper control system 100 coupled to a windshield wiper 120. As shown at FIG. 1, the windshield wiper control system 100 located proximate to a windshield 104. In the embodiment shown at FIG. 1, the control system 100 may be located above the windshield 104. In other embodiments, control system 100 may be located at different locations (e.g., below) proximate to the windshield 104. The control system 100 may be located in or on any part of an automobile and may be coupled to a frame of an automobile. Automobiles may include any type of vehicle having a windshield and wipers, such as agricultural vehicles (e.g., balers, tractors and combines), cars and trucks (e.g., pick-ups and tractor-trailers).

Control system 100 may include a movable element 102 configured to move in a first direction 105 and an opposing second direction 106. In some embodiments, movable element 102 may be configured to move substantially parallel to a surface of the windshield 104. In other embodiments, the control system 100 may be offset from the windshield 104 and may not move parallel to a surface of the windshield 104. The shape and size of movable element 102 shown at FIG. 1 is merely exemplary. Other embodiments may include movable elements having different geometries.

The control system 100 may also include actuation devices, such as springs 108 that are each configured to provide first forces to the movable element 102, causing the movable element 102 to move in the direction 105. Although each spring 108 applies its own force, the first force described herein is the product of the combined forces from the actuation devices, such as springs 108. Embodiments may include any number of actuation devices, including a single actuation device. Some embodiments may include other types of force mechanisms, such as actuators (e.g., linear actuators, electric actuators, hydraulic actuators, pneumatic actuator).

Figure 2:
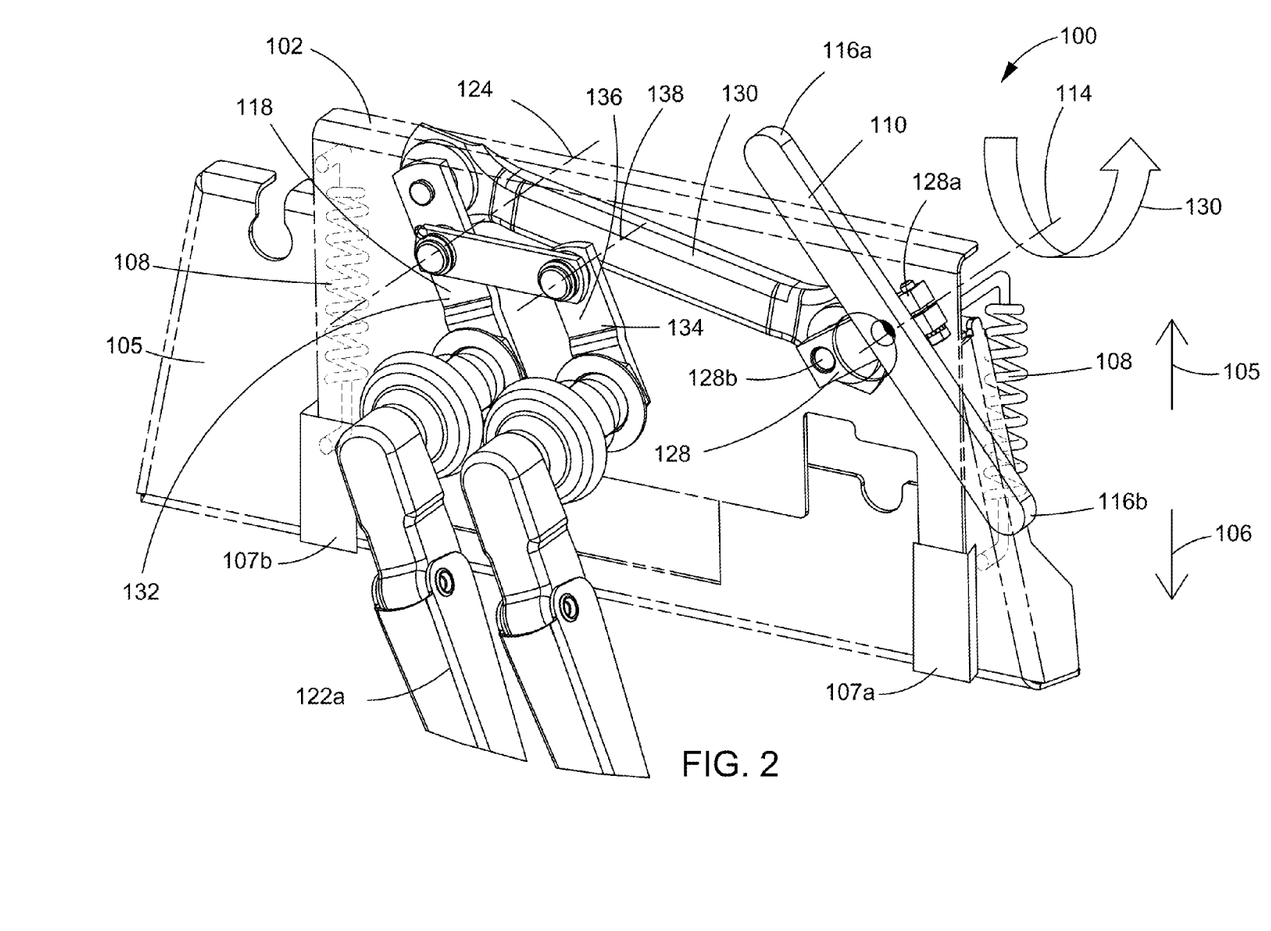
FIG. 2 is a close-up perspective view of the exemplary windshield wiper control system shown at FIG. 1 for use with embodiments of the present invention.

The control system 100 may also include fixed element 105 that is configured to remain stationary with respect to the movable element 102 or with respect to the windshield 104. In some embodiments, the fixed element 105 may be a portion of the windshield. As shown at FIG. 1, spring 108 (or other actuation device) may be coupled between fixed element 105 and movable element 102. The location of the spring 108 shown at FIG. 1 is merely exemplary. Other embodiments may include force mechanisms that are coupled between fixed elements and movable elements at different locations. In some embodiments, fixed elements may be part of an automobile body (not shown). In other embodiments, fixed elements may be separate from and coupled to the automobile body. In some embodiments, as shown at FIG. 1 and FIG. 2, the fixed element 105 may include side rails 107a and 107b. The movable element 102 may then be configured to move in the first direction 105 and the second direction 106 by sliding along side rails 107a and 107b. Embodiments may include any number of side rails. In some embodiments, the movable element 102 and fixed element 105 may not be directly coupled (e.g., no side rails). For example, gas actuators, hydraulic actuators or the like may be used in place of springs 108 and side rails 107a and 107b.

The control system 100 may also include a rotatable cam 110 coupled to the movable element 102 that is configured to provide a second force to the movable element 102 as the rotatable cam 110 rotates about a cam axis 114 in the counterclockwise direction, indicated by arrow 130. For example, a motor and axle (not shown) may be coupled to the rotatable cam 110 to rotate the rotatable cam 110 about cam axis 114. In some embodiments, rotatable cam 110 may rotate about a cam axis 114 in a clockwise direction. The second force may be provided in the direction 106 when the rotatable cam 110 contacts a stationary surface 112 with respect to the rotatable cam 110. The second force, which is described in more detail below with reference to FIG. 4A-FIG. 4F, may then cause the movable element 102 to move in the opposing second direction 106. In some embodiments, stationary surfaces which come into contact with rotatable cams may be part of an automobile body (not shown). In other embodiments, stationary surfaces may be separate from and coupled to the automobile body.

As shown at FIG. 1, the cam may extend outward in opposing directions from the center of the cam 110 and may include rounded edges at opposing ends 116a and 116b of the cam 110 which contact the stationary surface 112. In some embodiments, the cam 110 may include rotatable wheels 302a and 302b (shown at FIG. 3) at the opposing ends 116a and 116b that are configured to rotate as they contact the stationary surface. The shape and size of the rotatable cam 110 shown at FIG. 1, however, is merely exemplary. Other embodiments may include rotatable cams having different geometries that are configured to provide second forces when they contact stationary surfaces. In some embodiments, the stationary surface 112 may be a curved surface, as shown at FIG. 1. In other embodiments, stationary surfaces may be any shape, including non-curved surfaces.

The control system 100 may also include a wiper mechanism 118. As shown at FIG. 1, the wiper mechanism 118 may be coupled to windshield wiper 120 via a pair of pantograph arms 122a and 122b. In some embodiments, the wiper mechanism may be coupled to one pantographic arm or more than two pantograph arms. In some embodiments, wiper mechanisms may be coupled to more than one windshield wiper. The shape and sizes of the windshield wiper 120 and the pantograph arms 122a and 122b is merely exemplary. Other embodiments may include windshield wipers and pantograph arms having different geometries.

Wiper mechanism 118 may be coupled to the movable element 102 so that wiper mechanism 118 moves in the first direction 105 responsive to the force provided by spring 108. Wiper mechanism 118 coupled to the rotatable cam so that wiper mechanism 118 moves in the second direction 106 responsive to the force provided when the rotatable cam 110 contacts stationary surface 112. Wiper mechanism 118 may also be configured to pivot about a wiper mechanism pivot axis 124 in an arc motion responsive to the rotation of the rotatable cam 110. This arc motion and the motion in the first direction 105 and the second direction 106 may be distributed to the windshield wiper 120 via the pantograph arms 122a and 122b. The arc motion component of the windshield wiper 120 is shown as dashed line 126 at FIG. 1. The motion in the first direction 105 and the second direction 106, however, causes windshield wiper 120 to move across the surface of the windshield 104 in a direction that is more linear than the arc motion 126 of the wiper mechanism 118 and the windshield wiper 120, which is described in more detail below with reference to FIG. 4A-FIG. 4F. In some embodiments, control system 100 may cause the one or more windshield wipers to move across a surface of a windshield in a completely linear or substantially linear motion.

As shown at FIG. 2, control system 100 may include a driving rod 128 that extends from a center of the rotatable cam 110 and is configured to rotate about the cam axis 114 at a first end 128a of the driving rod 128. As shown at FIG. 2, the driving rod 128 is substantially perpendicular to the rotatable cam 110. As shown below with reference to FIG. 4A-FIG. 4F, driving rod 128 is also configured to remain substantially perpendicular to the rotatable cam 110 as the driving rod 128 rotates about the cam axis 114. Control system 100 may also include coupling bar 130. As shown, coupling bar 130 may be rotatably coupled to the driving rod 128 at an opposing driving rod end 128b and pivotably coupled to the wiper mechanism 118 at the wiper mechanism pivot axis 124.

Control system 100 may also include pivotable wiper mechanism arms 132 and 134 coupled to the pantographic arms 122a and 122b. For example, as shown at FIG. 2, a first wiper mechanism arm 132 may extend from the coupling bar 130 and be pivotably coupled to the coupling bar 130 so that the first wiper mechanism arm 132 may pivot about the wiper mechanism pivot axis 124 responsive to the rotation of the rotatable cam 110 and the rotation of the coupling bar 130 at driving rod end 128b. Second wiper mechanism arm 134 may be coupled to the first wiper mechanism arm 132 via bar 136. Second wiper mechanism arm 134 may be configured to pivot about a second wiper mechanism pivot axis 138. As shown, first wiper mechanism arm 132 may be coupled to first pantographic arm 122a and second wiper mechanism arm 134 may be coupled to second pantographic arm 122b. Accordingly, the pivoting motion of first wiper mechanism arm 132 and second wiper mechanism arm 134 may be distributed to the windshield wiper 120 via the pantograph arms 122a and 122b, which is shown across windshield 104 as dashed line 126 at FIG. 1.

Figure 3:
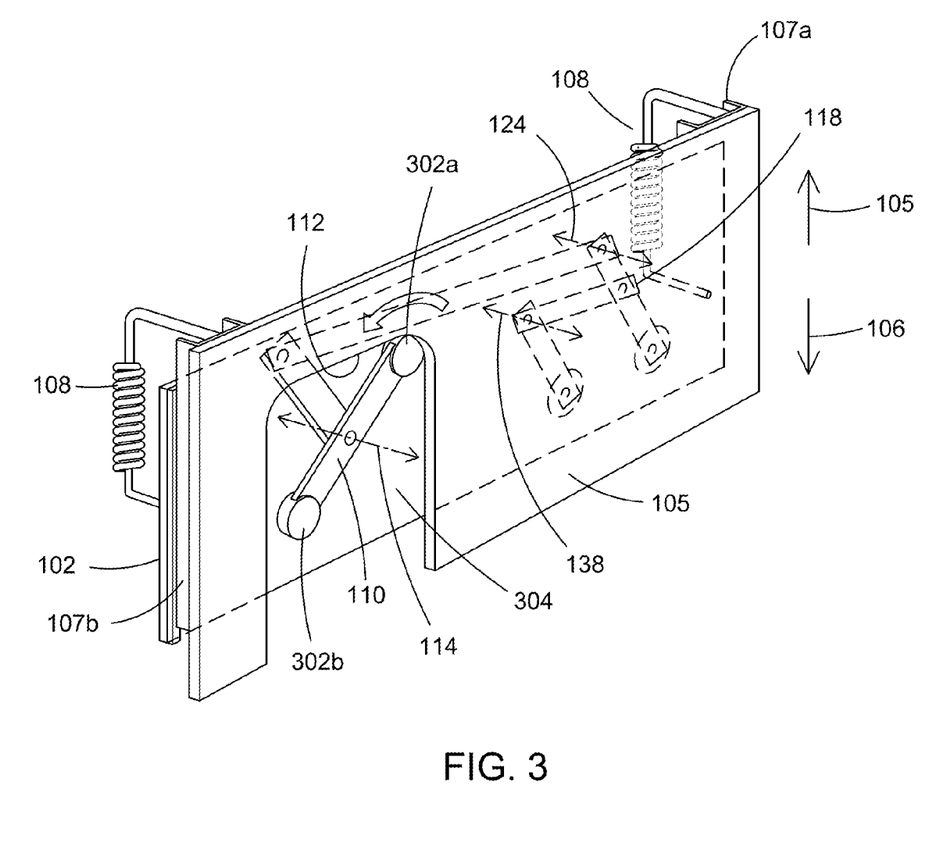
FIG. 3 is a close-up perspective view of an exemplary windshield wiper control system for use with embodiments of the present invention.

FIG. 3 is a close-up perspective view of an exemplary windshield wiper control system. As shown at FIG. 3, rotatable cam 110 may include rotatable wheels 302a and 302b. Fixed element 105 may include an opening 304. Stationary surface 112 which comes into contact with rotatable wheels 302a and 302b to provide the second force in the direction 106 may be located at an inner wall of the opening. Spring 108 may be coupled between the side rails 107a and 107b of the fixed element 105 and the movable element 102.

FIG. 4A-FIG. 4F are perspective views of an exemplary windshield wiper control system illustrating multiple states of an exemplary windshield wiper control system and a windshield wiper for use with embodiments of the present invention. FIG. 5 is a flow chart illustrating a method for controlling windshield wipers. The method for controlling windshield wipers is described below with reference to FIG. 4A-FIG. 4F and FIG. 5.

As shown at block 502, the method includes applying: (i) a first force to a movable element 102 to move the movable element 102 in a first direction 105 and (ii) a second force to the movable element 102 to move the movable element 102 in a second direction 106. For example, the first force may be applied to movable element 102 by springs 108 to move the movable element 102 in the first direction 105. The second force may be applied to the movable element 102 in the direction 106 when opposing edges 116a and 116b of the rotatable cam contact a stationary surface 112 as the rotatable cam 110 rotates about the cam axis 114 in the counterclockwise direction 130. The amount of the second force applied to the movable element 102 in the direction 106 may also decrease and increase (e.g., from the angle of the cam with respect to the surface 112) as the opposing edges 116a and 116b move across the stationary surface 112. As the second force applied to movable element 102 in the direction 106 decreases, the first force applied to the movable element 102 overcomes the second force and causes the movable element 102 to slide along rails 107a and 107b in the first direction 105 from its position shown at FIG. 4A sequentially through its positions shown at FIG. 4B, FIG. 4C and FIG. 4D. As the second force applied to movable element 102 in the direction 106 increases, the second force applied to the movable element 102 overcomes the first force and causes the movable element 102 to slide along rails 107a and 107b in the second direction 106 from its position shown at FIG. 4D sequentially through its positions shown at FIG. 4E and FIG. 4F.

Figure 4A:
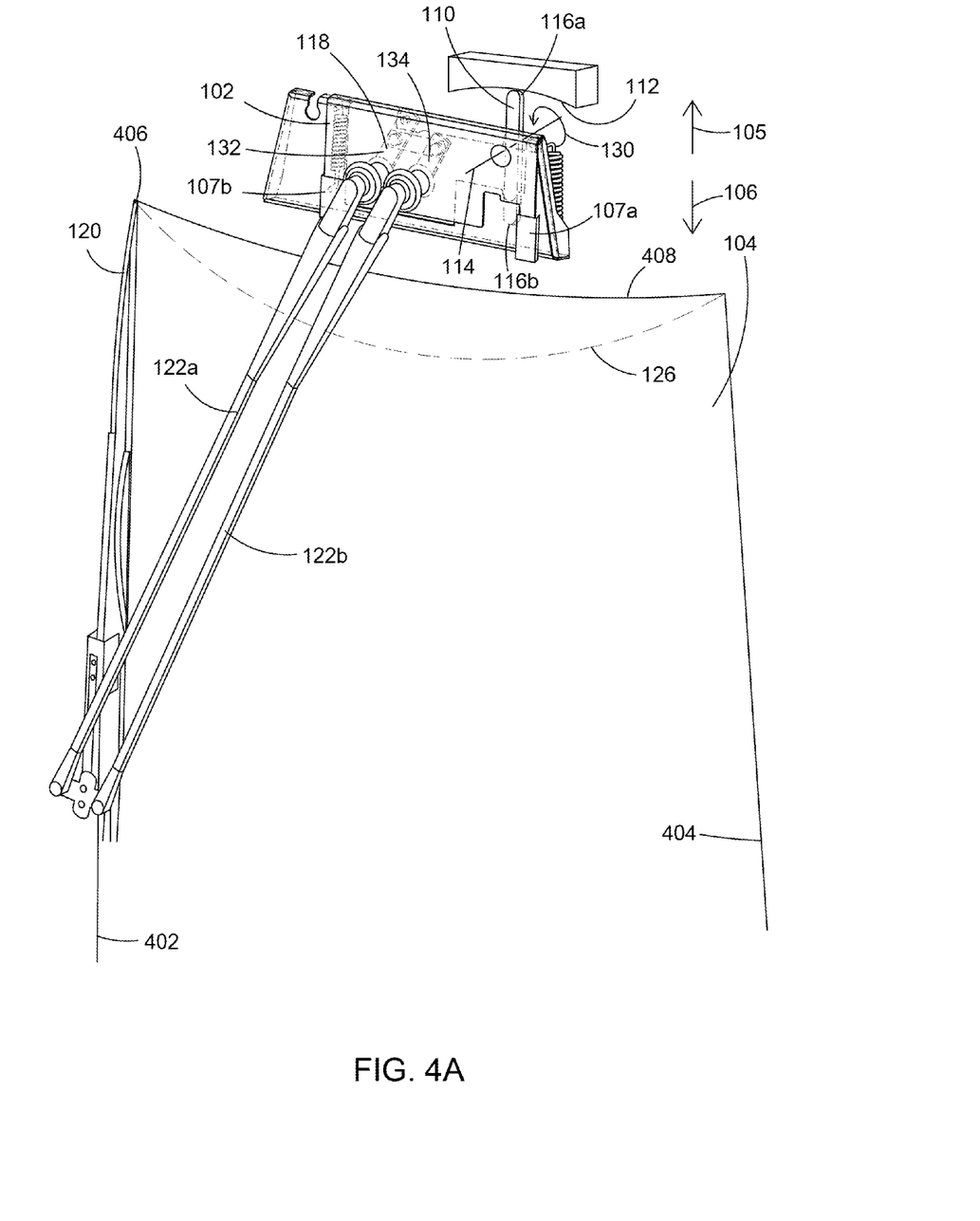
FIG. 4A-FIG. 4G are perspective views of an exemplary windshield wiper control system illustrating multiple states of an exemplary windshield wiper control system and a windshield wiper for use with embodiments of the present invention.
Figure 4B:
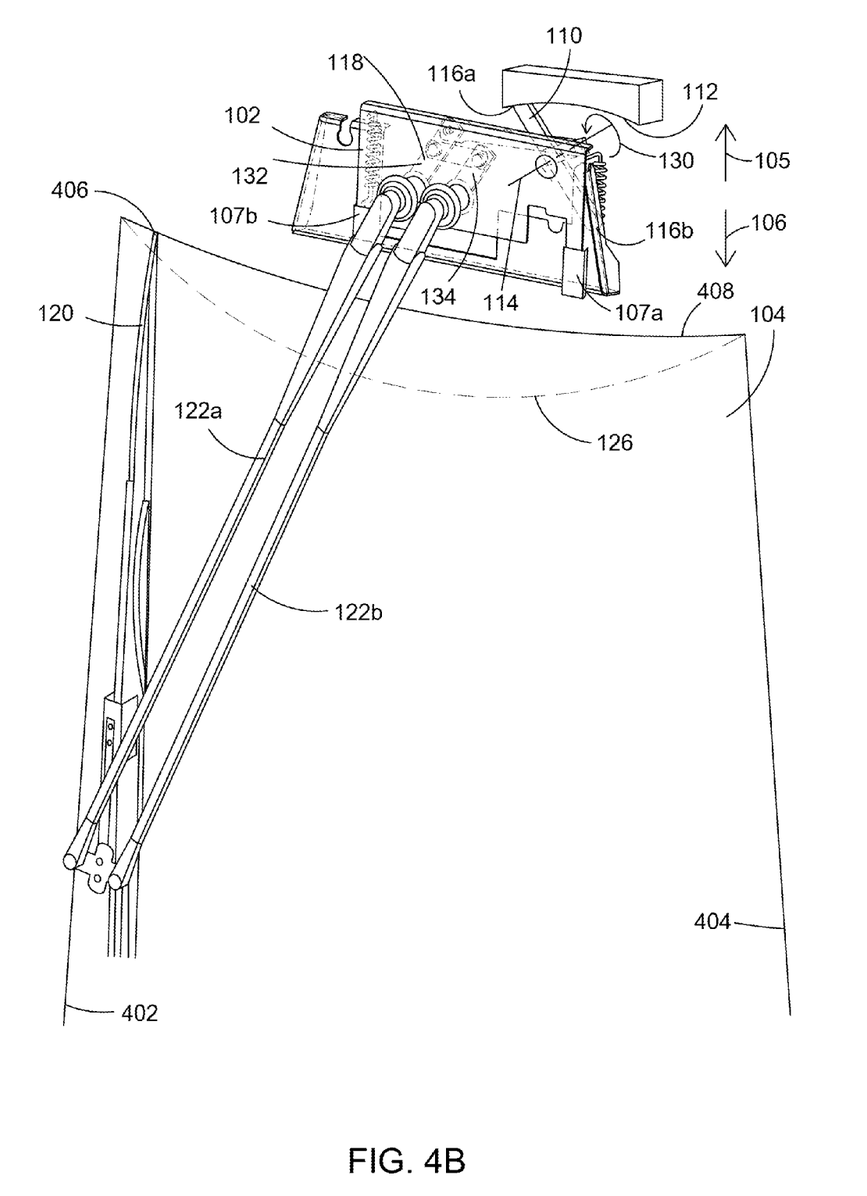
Figure 4C:
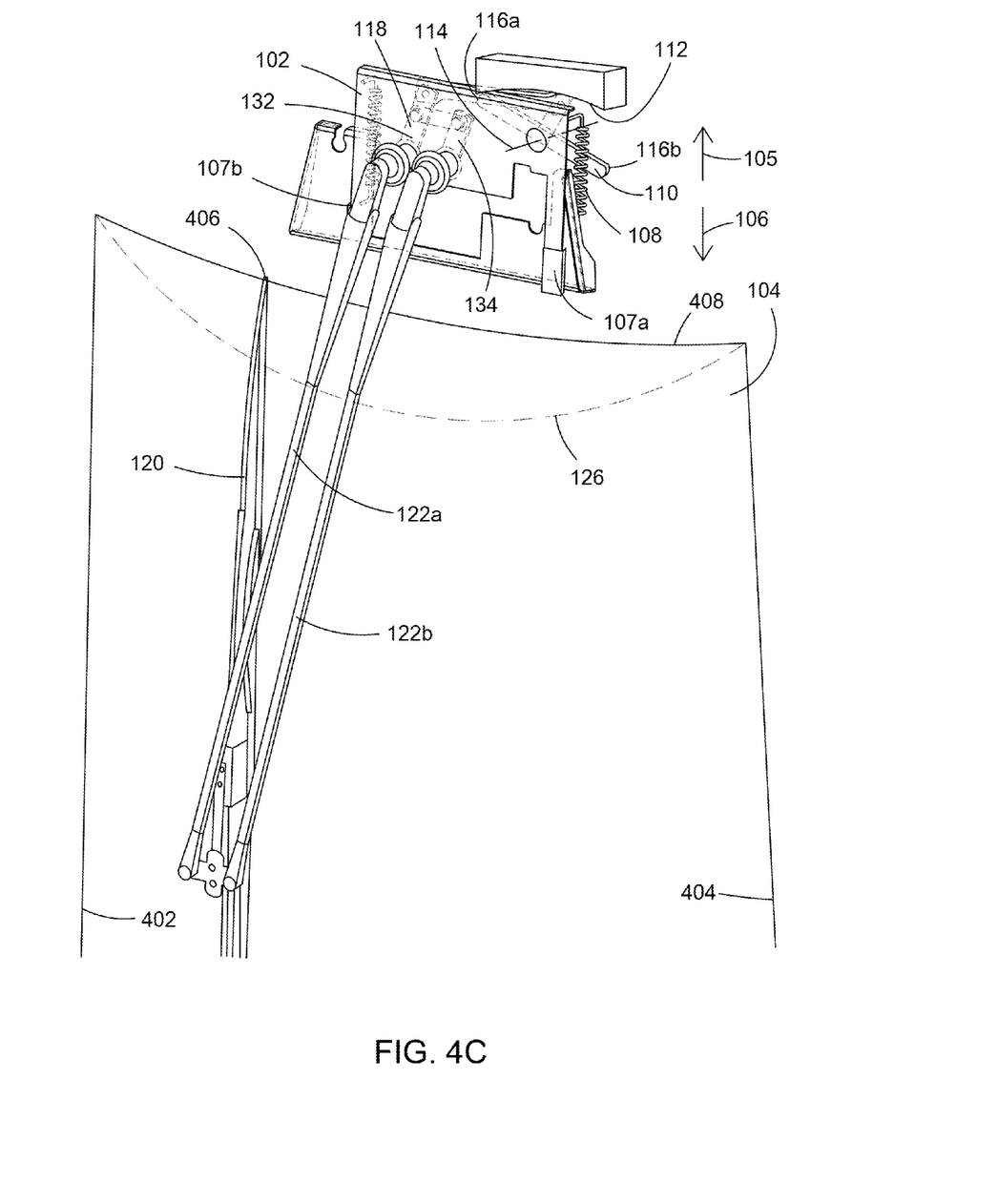

The movable element 102 is at its lowest position when rotatable cam 110 is in the position shown at FIG. 4A and cam edge 116a is contacting surface 112. When rotatable cam 110 rotates to its position shown at FIG. 4B and cam edge 116a is contacting surface 112 as shown at FIG. 4B, the second force in the direction 106 is decreased and the first force from the springs 108 becomes greater than the second force and movable element 102 is caused to move in the direction 105 to its position shown at FIG. 4B. When rotatable cam 110 rotates to its position shown at FIG. 4C and cam edge 116a is contacting surface 112 at the angle shown at FIG. 4C, the second force in the direction 106 is further decreased and the first force from the springs 108 cause movable element 102 to move in the direction 105 to its position shown at FIG. 4C. When rotatable cam 110 rotates to its position shown at FIG. 4D and cam edge 116a is not contacting surface 112, the first force from the springs 108 causes movable element 102 to move in the direction 105 to its highest position shown at FIG. 4D.

Figure 4D:
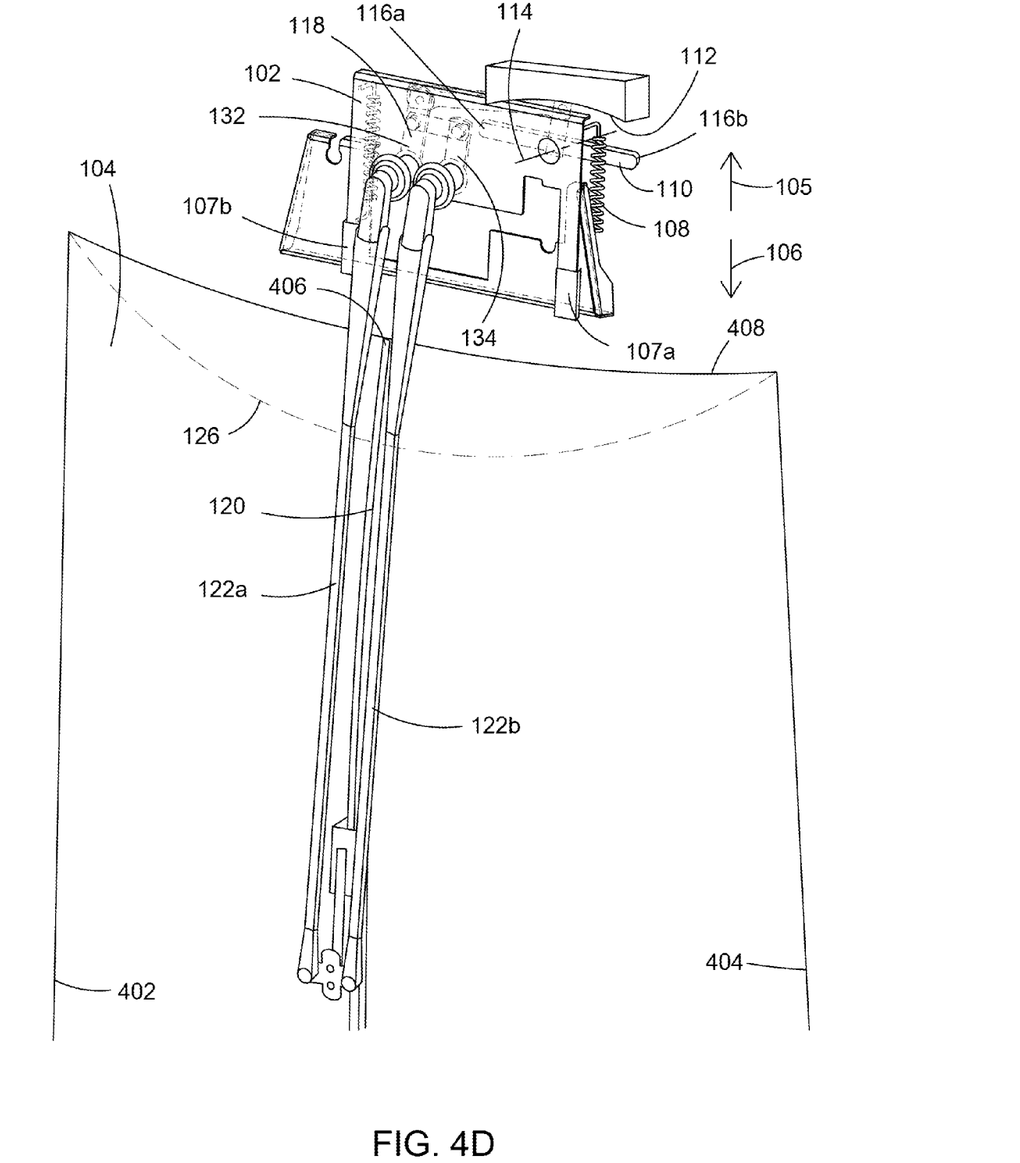
Figure 4E:
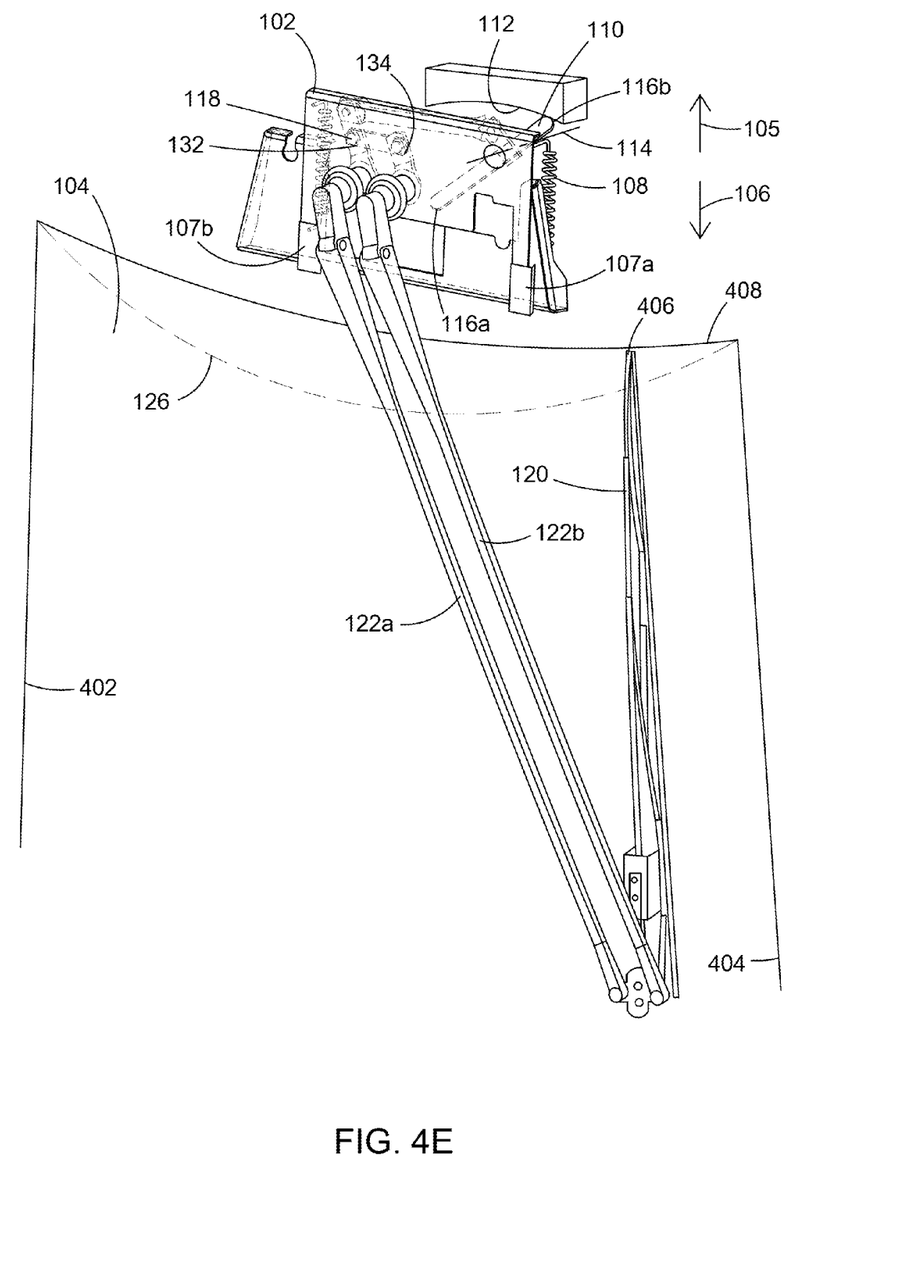
Figure 4F:
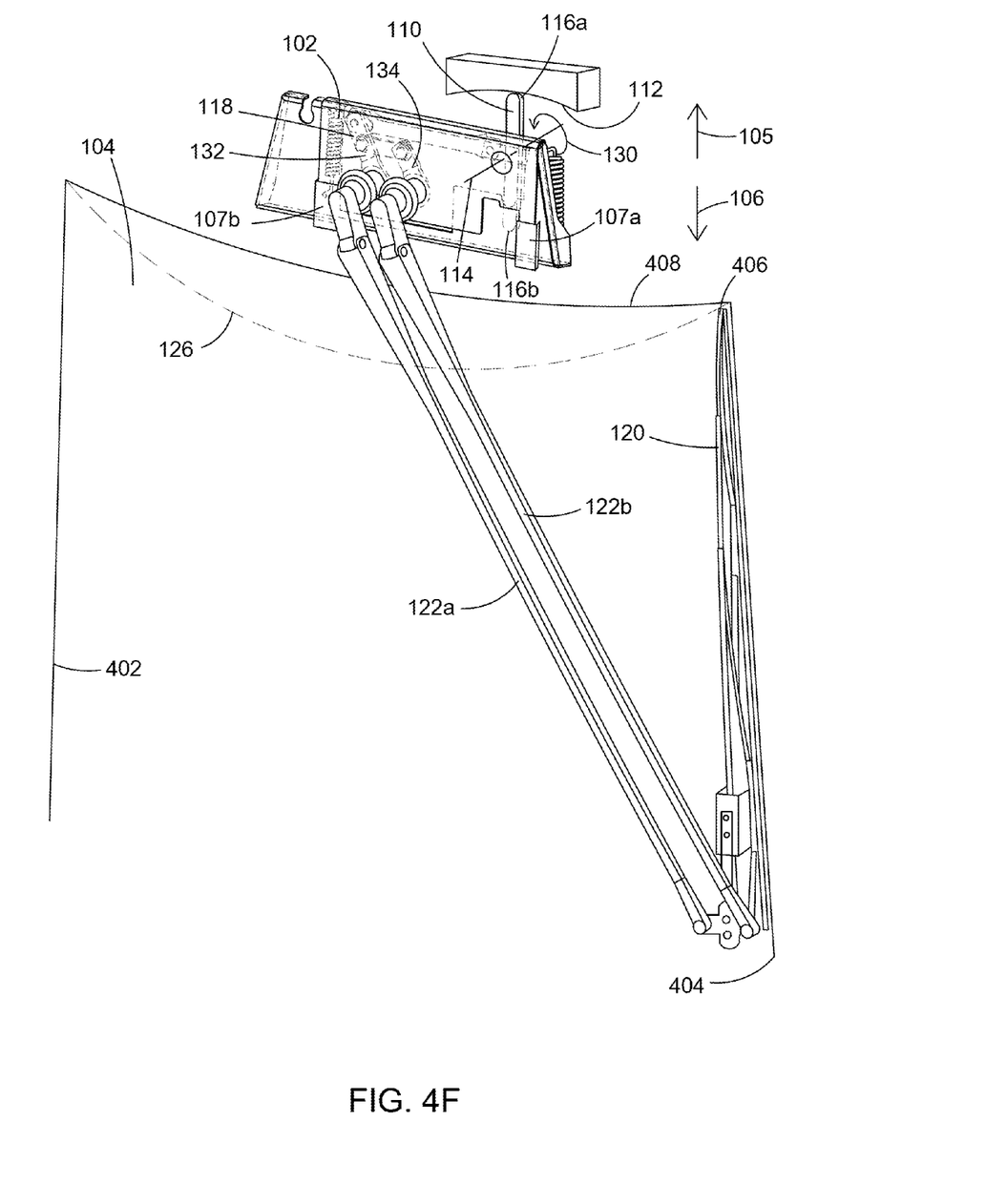
Figure 5:
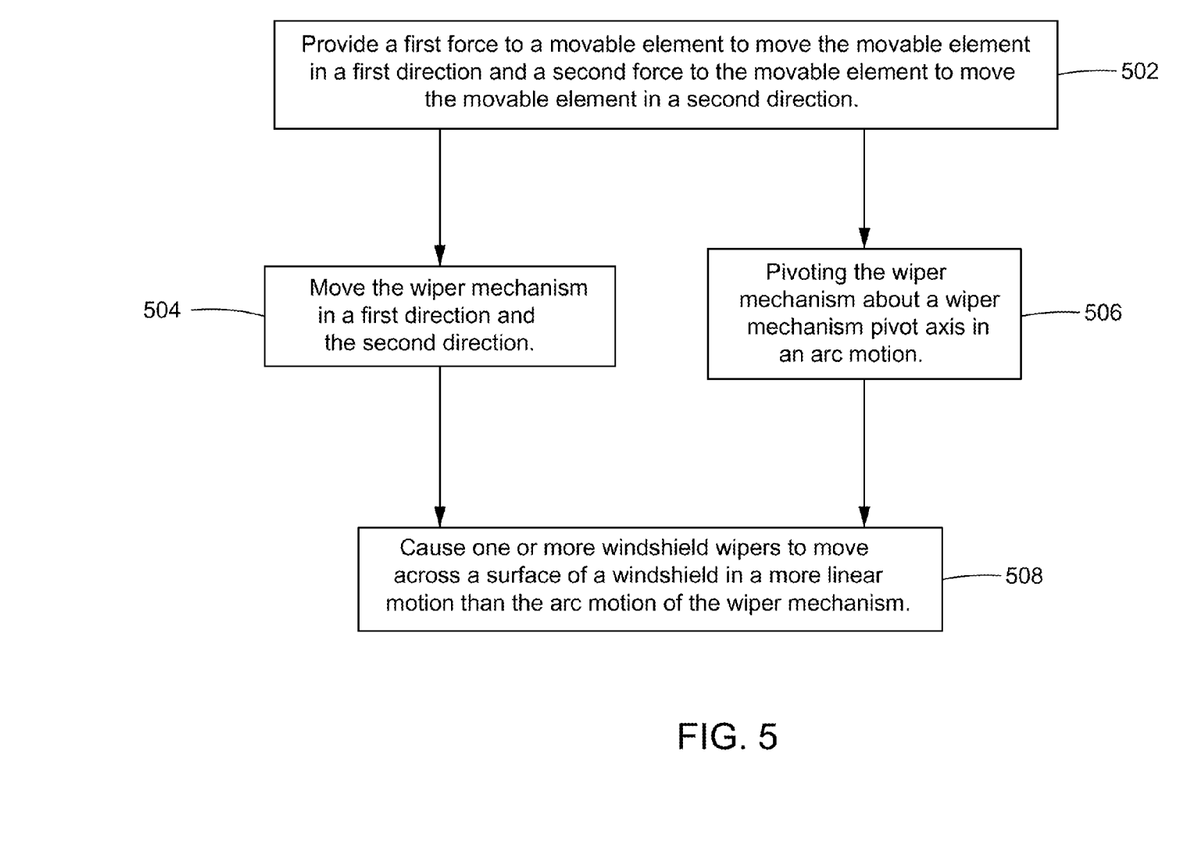
FIG. 5 is a flow chart illustrating a method for controlling windshield wipers in accordance with an embodiment of the invention.

When rotatable cam 110 rotates to its position shown at FIG. 4E and cam edge 116b contacts surface 112 as shown at FIG. 4D, the second force in the direction 106 increases and the second force becomes greater than the first force from the springs 108 and movable element 102 is caused to move in the direction 106 to its position shown at FIG. 4E. When rotatable cam 110 rotates to its position shown at FIG. 4F and cam edge 116b contacts surface 112 as shown at FIG. 4F, the second force in the direction 106 further increases and movable element 102 is again caused to move in the direction 106 to its lowest position shown at FIG. 4F.

The process of moving the movable element 102 in the first direction 105 and the second direction 106 then repeats as the rotatable cam 110 continues to rotate about the cam axis 114. For example, when rotatable cam 110 rotates to its position shown at FIG. 4G and cam edge 116b is contacting surface 112 as shown at FIG. 4B, the second force in the direction 106 once again decreases and the first force from the springs 108 becomes greater than the second force and movable element 102 is caused to move in the direction 105 to its position shown at FIG. 4G.

As shown at blocks 504 and 506, the method includes moving a wiper mechanism (i) in the first direction responsive to the movement of the movable element in the first direction; (ii) the second direction responsive to the movement of the movable element in the second direction. As shown at block 506, the method also includes pivoting the wiper mechanism in an arc motion, responsive to the rotation of the cam 110. As shown at block 508, the method also includes causing one or more windshield wipers 120 to move across a surface of a windshield 104 in a more linear motion than the arc motion 126 of the wiper mechanism 118. In the embodiments shown at FIG. 4A-FIG. 4F, the arc motion 120 of the wiper mechanism arms 132 and 134 is distributed to the wiper 120 and is indicated by the dashed line 120 on the surface of the windshield 104. As shown at FIG. 4A-FIG. 4F and described below, as wiper 120 moves across the surface of the windshield 104 from the left edge 402 toward the right edge 404 of windshield 104, the top edge 406 of wiper 120 moves in a more linear motion than the arc motion 126 of the wiper arms 132 and 134 of wiper mechanism 118. Further, as shown at FIG. 4A-FIG. 4F, windshield wiper 120 may be controlled to move across the surface of the windshield 104 substantially parallel to a top edge 408 of the windshield 104. In some embodiments, however, the windshield wiper control system 100 may be configured to move one or more wipers 120 across the surface of the windshield 104 substantially parallel to a bottom edge (not shown) of the windshield 104. In some embodiments, however, the windshield wiper control system 100 may be configured to move one or more wipers 120 across the surface of the windshield 104 such that the wiped area is a substantially rectangular area.

When movable element 102 moves in the direction 105 from its position at FIG. 4A to its position shown at FIG. 4B, wiper arms 132 and 134 of wiper mechanism 118 move with the movable element 102 in the first direction 105 to the wiper mechanism position shown at FIG. 4B. As cam 110 rotates from its position at FIG. 4A to its position at FIG. 4B, wiper arms 132 and 134 of wiper mechanism 118 remain substantially parallel to each other as they pivot about their respective pivot axis in an arc motion 120 from their positions at FIG. 4A to their positions at FIG. 4B. Further, as wiper arms 132 and 134 move with the movable element 102 in the first direction 105 and pivot about their respective wiper mechanism pivot axis in arc motion 120, windshield wiper 120 is controlled to move across the surface of windshield 104 in a more linear motion than the arc motion 126 of the wiper arms 132 and 134 of wiper mechanism 118.

Wiper arms 132 and 134 of wiper mechanism 118 continue to move with the movable element 102 in the first direction 105 sequentially from its position at FIG. 4B to its position shown at FIG. 4C and FIG. 4D. Wiper arms 132 and 134 of wiper mechanism 118 continue to pivot about their respective wiper mechanism pivot axis in arc motion 120 sequentially from their positions at FIG. 4B to their positions at FIG. 4C and FIG. 4D. Further, as wiper arms 132 and 134 move with the movable element 102 in the first direction 105 and pivot about their respective wiper mechanism pivot axis in arc motion 120, windshield wiper 120 is controlled to move across the surface of windshield 104 in a more linear motion than the arc motion 126.

Wiper arms 132 and 134 of wiper mechanism 118 move with the movable element 102 in the second direction 106 sequentially from its position at FIG. 4D to its position shown at FIG. 4E and FIG. 4F. Wiper arms 132 and 134 of wiper mechanism 118 continue to pivot about their respective wiper mechanism pivot axis in arc motion 120 sequentially from their positions at FIG. 4B to their positions at FIG. 4E and FIG. 4F. Further, as wiper arms 132 and 134 move with the movable element 102 in the second direction 106 and pivot about their respective wiper mechanism pivot axis in arc motion 120, windshield wiper 120 is controlled to move across the surface of windshield 104 in a more linear motion than the arc motion 126 until wiper 120 reaches right edge 404 of windshield 104.

Figure 4G:
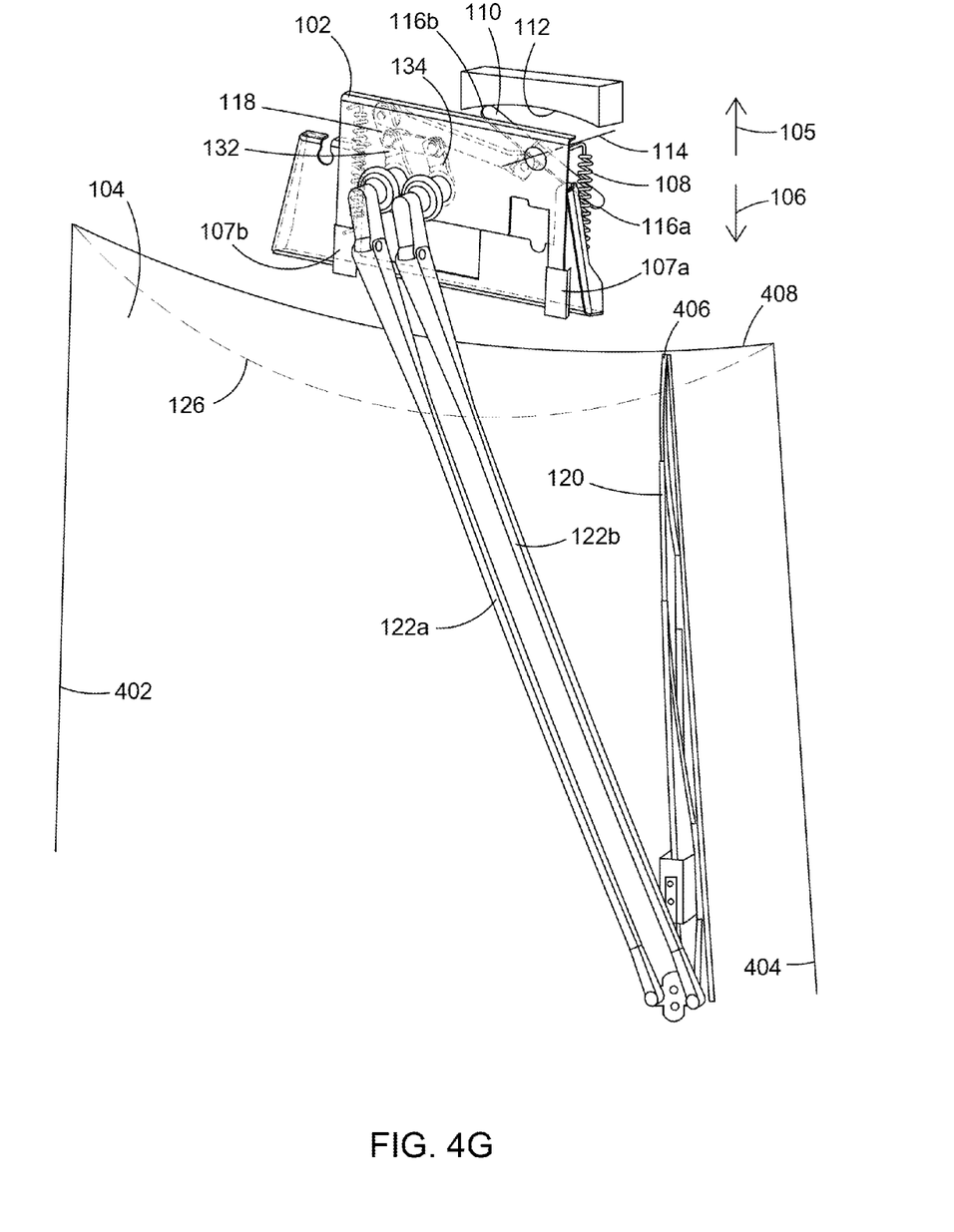

Wiper arms 132 and 134 of wiper mechanism 118 once again move with the movable element 102 in the first direction 105 from their positions shown at FIG. 4F to their positions shown at FIG. 4G and wiper arms 132 and 134 of wiper mechanism 118 pivot back in an arc motion 120 from their positions at FIG. 4A to their positions at FIG. 4B. Further, as wiper arms 132 and 134 move with the movable element 102 in the first direction 105 and pivot back in arc motion 120, windshield wiper 120 is controlled to move back across the surface of windshield 104 from the right edge 404 toward the left edge 402 of windshield 104 in a more linear motion than the arc motion 126.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A windshield wiper control system, comprising:
    a movable element configured to move in a first direction and an opposing second direction;
    one or more actuation devices configured to provide a first force to the movable element causing the movable element to move in the first direction;
    a rotatable cam configured to provide a second force to the movable element to cause the movable element to move in the opposing second direction when the rotatable cam contacts a stationary surface as the rotatable cam rotates about a cam axis; and
    a wiper mechanism: (i) coupled to the movable element and configured to move in the first and second directions; and (ii) coupled to the rotatable cam and configured to pivot about a wiper mechanism pivot axis in an arc motion responsive to the rotation of the rotatable cam,
    wherein the wiper mechanism is further configured to be coupled to one or more windshield wipers to cause the one or more windshield wipers to move across a surface of a windshield in a more linear motion than the arc motion of the wiper mechanism.

2. The windshield wiper control system of claim 1, wherein the wiper mechanism is further configured to cause one or more windshield wipers to move across the surface of the windshield substantially parallel to a top edge of the windshield.

3. The windshield wiper control system of claim 1, further comprising a fixed element configured to remain stationary with respect to the movable element, and
    wherein the one or more actuation devices comprise one or more force mechanisms coupled between the movable element and the fixed element to move the movable element.

4. The windshield wiper control system of claim 3, wherein the fixed element includes one or more side rails and the movable element is configured to move in the first and second directions by sliding along the one or more side rails.

5. The windshield wiper control system of claim 1, wherein the stationary surface is a curved surface.

6. The windshield wiper control system of claim 1, wherein the rotatable cam is further configured to provide the second force to the movable element when opposing edges of the cam contact the stationary surface as the rotatable cam rotates about the cam axis.

7. The windshield wiper control system of claim 6, wherein the rotatable cam comprises rotatable wheels at the opposing edges thereof and the rotatable wheels are configured to rotate as they contact the stationary surface.

8. The windshield wiper control system of claim 1, further comprising a driving rod configured to rotate about the cam axis at a driving rod end and remain substantially perpendicular to the rotatable cam when the driving rod rotates about the cam axis, and
    a coupling bar rotatably coupled to the driving rod at an opposing driving rod end and pivotably coupled to the wiper mechanism at the wiper mechanism pivot axis.

9. The windshield wiper control system of claim 8, wherein the wiper mechanism comprises one or more wiper mechanism arms configured to pivot responsive to the rotation of the rotatable cam.

10. The windshield wiper control system of claim 9, wherein the one or more wiper mechanism arms comprise:
    a first wiper mechanism arm extending from the coupling bar and configured to pivot about the wiper mechanism pivot axis responsive to the rotation of the rotatable cam; and
    a second wiper mechanism arm coupled to the first wiper mechanism arm and configured to pivot about another wiper mechanism pivot axis,
    wherein the first wiper mechanism arm and the second wiper mechanism arm are configured to remain substantially parallel to each other when they pivot about their respective axis.

11. The windshield wiper control system of claim 9, further comprising one or more pantograph arms coupled between the one or more windshield wipers and the one or more wiper mechanism arms.

12. An automobile comprising:
    an automobile body;
    a windshield coupled to the automobile body having opposing top and bottom edges and opposing side edges;
    one or more windshield wipers configured to move across a surface of the windshield; and
    a windshield wiper control system comprising:
        a movable element configured to move in a first direction and an opposing second direction;
        one or more actuation devices configured to provide a first force to the movable element to cause the movable element to move in the first direction;

a rotatable cam configured to provide a second force to the movable element to cause the movable element to move in the opposing second direction when the rotatable cam contacts a stationary surface as the rotatable cam rotates about a cam axis; and a wiper mechanism: (i) coupled to the movable element and configured to move in the first and second directions; and (ii) coupled to the rotatable cam and configured to pivot about a wiper mechanism pivot axis responsive to the rotation of the rotatable cam, wherein the wiper mechanism causes the one or more windshield wipers to move across the surface of the windshield between the opposing side edges and substantially parallel to the top edge of the windshield.

13. The automobile of claim 12, further comprising a fixed element configured to remain stationary with respect to the movable element, and wherein the one or more actuation devices comprise one or more spring force mechanisms coupled between the movable element and the fixed element.

14. The automobile of claim 13, wherein the fixed element is coupled to the automobile body.

15. The automobile of claim 12, wherein the rotatable cam is further configured to provide the second force to the movable element when opposing edges of the cam contact the stationary surface as the rotatable cam rotates about the cam axis.

16. The automobile of claim 12, wherein the wiper mechanism comprises a plurality of wiper mechanism arms coupled to the one or more windshield wipers, the plurality of wiper mechanism arms comprising:

a first wiper mechanism arm configured to pivot about the wiper mechanism pivot axis responsive to the rotation of the rotatable cam; and a second wiper mechanism arm coupled to the first wiper mechanism arm and configured to pivot about another wiper mechanism pivot axis, wherein the first wiper mechanism arm and the second wiper mechanism arm are configured to remain substantially parallel to each other when they pivot about their respective axis.

17. The automobile of claim 12, wherein the plurality of wiper mechanism arms are coupled to the one or more windshield wipers via respective first and second pantograph arms.

18. The automobile of claim 12, wherein the wiper mechanism is further configured to move the one or more windshield wipers across the surface of the windshield to cause a substantially rectangular shaped wiped area on the surface of the windshield.

* * * * *